June 16, 1953     J. MARKOWITZ     2,642,253

VIBRATION ISOLATOR

Filed March 8, 1947

Inventor:
Jesse Markowitz
Charles E. Cred
Agent

Patented June 16, 1953

2,642,253

UNITED STATES PATENT OFFICE 2,642,253

VIBRATION ISOLATOR

Jesse Markowitz, Forest Hills, N. Y.

Application March 8, 1947, Serial No. 733,347

7 Claims. (Cl. 248—358)

My invention relates to flexible mountings, known as isolators or absorbers, which are used to prevent or reduce the transmission of vibration, impact or noise between structures which must be mechanically connected. For example, isolators are used for mounting machines or devices which create disturbances likely to cause misoperation or deterioration of adjacent instruments or equipment. Examples falling in this category are: motors, fans, solenoid actuated devices and other apparatus whose operation sets up dynamic forces.

Another application is for mounting delicate apparatus that must be protected from vibrations and impacts which are generated by adjacent machinery. A primary application in this category is for mounting instruments and electronic equipment in airplanes. It is also desirable to mount phonograph pickups on vibration isolators to prevent vibration and noise feeding back from the speaker to the pick-up. Vacuum tubes, condensers, and other components of electronic equipment are commonly mounted on vibration isolators both to protect the components from damage and to prevent misoperation which results from sudden movement of the component.

My invention utilizes rubber in flexure as contrasted to rubber in shear or compression as used in other types of isolators. The use of rubber in flexure makes possible the large static deflections required to isolate low frequency vibrations. It is also possible by using rubber in flexure to obtain a relatively low stiffness in all directions to isolate the vibrations impressed from many sides.

An object of my invention is to provide a vibration isolator which is capable of withstanding relatively large static deflections so as to be useful for isolating very low frequency vibrations.

Another object of my invention is to provide a vibration isolator capable of supporting very light loads and whose size is very small to enable its use in the small spaces encountered with lightweight equipment.

Another object is to provide a vibration isolator which may be conveniently attached to the adjacent structures without making it necessary to use the costly manufacturing operations necessary to bond metal to rubber. The resulting isolator is, therefore, characterized by its low cost compared with the usual bonded type isolators.

A further object is to provide a vibration isolator which may be made adaptable to a wide range of mounting conditions and loads.

A further object is to provide an isolator which is capable of being deflected sideways a relatively large distance without engaging a rigid snubber. In some types of application it is desirable to avoid the use of a rigid lateral snubber so that the operation of the isolator at near resonant conditions is relatively smooth.

A still further object is to provide a vibration isolator which can be adapted to utilize a rigid snubber where the restraint provided by such a snubber is of more importance than the smooth operation in the vincinity of resonance.

A further object is to provide an isolator whose cost may be maintained at a minimum where a safety retaining device is not necessary. In the use of my invention, however, it is possible without making any other modifications to utilize a safety retaining pin. It is possible when using such a safety retaining pin to provide cushion snubbers to prevent excessive movement of the supporting and supported structure.

Other objects and advantages of my invention will be apparent from the following detailed description and accompanying drawings.

Figures 3 to 8 inclusive are sectional views showing modified forms of my invention.

Figure 1:
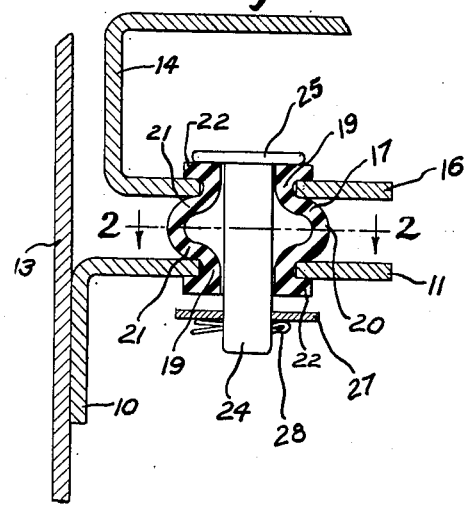
Figure 1 is a sectional view showing a preferred embodiment of my invention.
Figure 2:
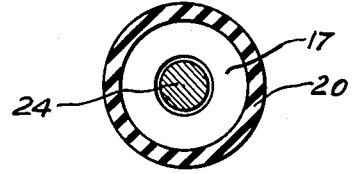
Figure 2 is a section on line 2—2 of Figure 1.

In the embodiment of my invention shown in Figure 1, the supporting structure 10 includes a horizontal bracket 11 rigidly attached to the side wall 13 of a cabinet or case. The supported structure 14 includes a lower horizontal flange 16 which overlies the bracket 11 of the supporting structure 10. The flange 16 and bracket 10 are provided with aligned apertures. The vibration isolator 17 is tubular in shape and has a narrow portion 19 adjacent each end and a wide portion 20 at the center connected to the narrow portions by parts 21. Laterally extending flanges 22 are provided at each end and form, in conjunction with the parts 21, grooves adjacent the ends of the isolator.

The isolator 17 is applied in such a way that each flange 22 is inserted through the aperture in the supported (14) or supporting (10) structure so that the structures nest in the grooves formed by the flanges 22 and parts 21. The isolator 17 is subjected to the vertically downward load of the supported structure 14 so that the connecting parts 21 of the isolator are subjected to bending or flexure; in other words, the diameter at the center tends to increase somewhat while the ends of the isolator tend to be forced closer together. A safety retaining pin 24 is provided. The pin 24 has a head 25 on its upper end and a washer 27, retained by a cotter pin 28, at its lower end. Excessive upward movement of the supported structure 14 is prevented by the engagement of the head 25 and the washer 27 with the flanges 22 of the isolator. Free sideways movement of the supported structure 14 relative to the supporting structure 10 is permitted to take place by the tipping or rotation of the safety retaining pin 24.

Figure 3:
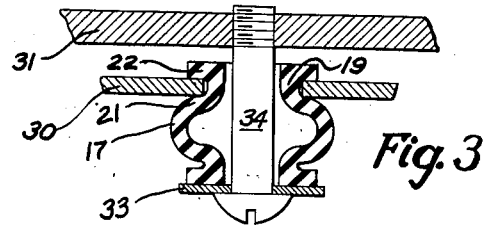

In the modification shown in Figure 3, the supported structure 30 is below the supporting structure 31. The isolator 17 rests upon the washer 33 which is supported by the depending screw 34. The supported structure 30 nests, as previously described in connection with Figure 1, in the groove formed by the connecting part 21 of the isolator and the end flange 22. A cushioned snubber prevents excessive sideways movement as the narrow portion 19 of the isolator is squeezed between the supported structure 30 and the screw 34.

Figure 4:
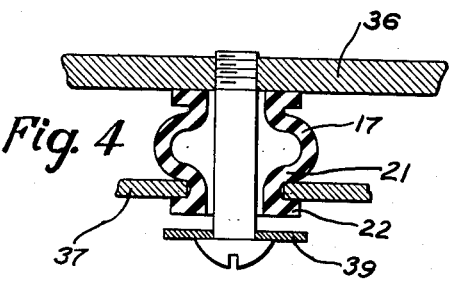

In the modification shown in Figure 4, the supported structure 36 is above the supporting structure 37. The supporting structure 37 nests in the groove between the connecting parts 21 of the isolator 17 and the end flange 22. Sideways movement is limited as described in connection with Figure 3 and excessive upward movement of the supported structure 36 is prevented by the cushioned engagement of the washer 39 with the flange 22.

Figure 5:
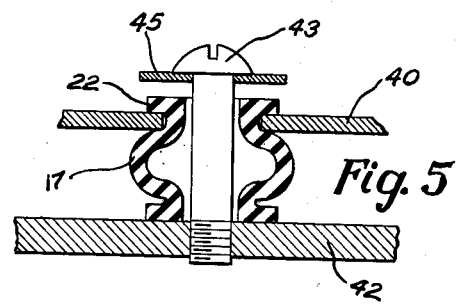

Figure 5 shows another embodiment in which the supported structure 40 is disposed above the supporting structure 42. Sideways movement is restricted by the rigidly attached screw 43 and upward movement of the supported structure 40 is restricted by engagement of the flange 22 of the isolator with the washer 45.

Figure 6:
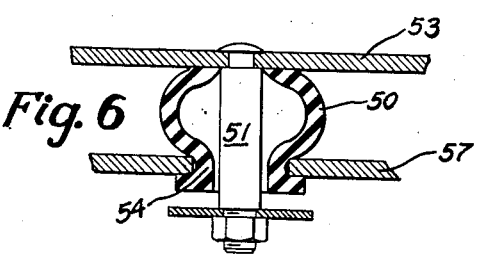

Figure 6 is somewhat similar to Figure 4 except that the isolator 50 is provided with a flange at only the lower end. The center pin 51 fits snugly through the upper end of the isolator and is rigidly attached by a suitable means, such as riveting, to the supported structure 53. Lateral clearance is provided between the pin 51 and the narrow portion 54 of the isolator to permit the supported structure 53 to move relative to the supporting structure 57.

Figure 7:
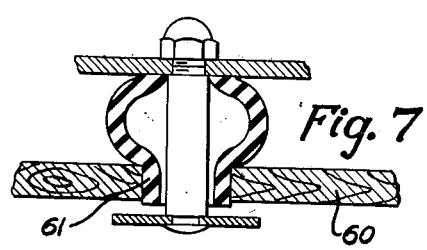

Figure 7 shows the application of my invention wherein the supporting structure 60 is made of wood or other material which requires a relatively thick panel. The isolator in this case terminates at its lower end in a depending narrow part 61 of constant width which fits snugly through the aperture in the supporting structure 60.

Figure 8:
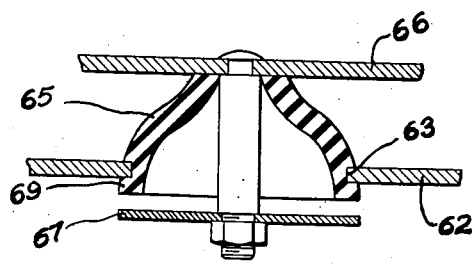

Figure 8 is an embodiment wherein the supporting structure 62 nests in a groove 63 which subscribes the isolator 65 adjacent its lower end and substantially at its widest portion. Upward movement of the supported structure 66 is restricted by engagement of the washer 67 with the lower rim 69 of the isolator.

The accompanying drawings illustrate the preferred forms of the invention, although it is to be understood that the invention is not limited to the exact details of construction shown and described, as it is obvious that various modifications thereof, within the scope of the claims, will occur to persons skilled in the art.

I claim:

1. Vibration isolator comprising a hollow bulbar elastic body, restricted portions at opposite ends thereof, said ends having openings therein, a rigid member secured at one of said ends, a rigid pin in said openings and passing through said body, the diameter of said pin being less than the diameter of said openings, a second rigid member secured to the other end of said body, one end of said pin being attached to one of said members and the other end of said pin carrying a washer, one end of said pin being spaced from the adjacent end of said body to permit relative movement therebetween.

2. Vibration isolator comprising a hollow bulbar elastic body, restricted portions at opposite ends thereof, an integral flange adjacent to at least one of said restricted portions at the end of said body, said ends having openings therein, a rigid member secured at one of said ends, a rigid pin in said openings and passing through said body, the diameter of said pin being less than the diameter of said openings, a second rigid member secured to the other end of said body, one end of said pin being attached to one of said members and the other end of said pin carrying a washer, one end of said pin being spaced from the adjacent end of said body to permit relative movement therebetween, one of said rigid members being held between said flange and body.

3. Vibration isolator comprising a hollow bulbar elastic body, restricted portions at opposite ends thereof, a pair of integral flanges adjacent to said restricted portions at the opposite ends of said body, said ends having openings therein, a rigid member secured at one of said ends, a rigid pin in said openings and passing through said body, the diameter of said pin being less than the diameter of said openings, a second rigid member secured to the other end of said body, one end of said pin being attached to one of said members and the other end of said pin carrying a washer, one end of said pin being spaced from the adjacent end of said body to permit relative movement therebetween, each of said rigid members being held between a flange and said body.

4. Vibration isolator comprising a hollow bulbar elastic body, restricted portions at opposite ends thereof, said ends having openings therein, a rigid member secured at one of said ends, a rigid pin in said openings and passing through said body, the diameter of said pin being less than the diameter of at least one of said openings, a second rigid member secured to the other end of said body, one end of said pin being attached to one of said members and the other end of said pin carrying a washer, one end of said pin being spaced from the adjacent end of said body to permit relative movement therebetween.

5. Vibration isolator comprising a hollow bulbar elastic body, a restricted portion at at least one end thereof, the ends of said body having openings therein, a rigid member secured to said restricted portion, a rigid pin secured to said member in said openings and passing through said body, the diameter of said pin being less than the diameter of said openings, a second rigid member secured to the other end of said body, the other end of said pin carrying a washer, said washer being spaced from the adjacent end of said body to permit relative movement therebetween.

6. Vibration isolator comprising a hollow bulbar elastic body, restricted portions at opposite ends thereof, said ends having openings therein, a rigid member secured at one of said ends, a rigid pin in said openings and passing through said body, the diameter of said pin being less than the diameter of said openings, a second rigid member secured to the other end of said body, said pin being free from attachment to said body and adapted for movement relative to said body, one end of said pin having a head and the other end having a washer, one end of said pin being spaced from the adjacent end of said body to permit relative movement therebetween.

7. Vibration isolator comprising a hollow bulbar elastic body, restricted portions at opposite ends thereof, said ends having openings therein, a rigid member secured at one of said ends, a rigid pin in said openings and passing through said body, the diameter of said pin being less than the diameter of said openings, a second rigid member secured to the other end of said body, one end of said pin having a head adjacent to one of said members and a stop adjacent the other member, one end of said pin being spaced from the adjacent end of said body to permit relative movement therebetween.

JESSE MARKOWITZ.

References Cited in the file of this patent

UNITED STATES PATENTS

| Number | Name | Date |
| --- | --- | --- |
| 1,369,389 | Browne | Feb. 22, 1921 |
| 2,110,701 | Farmer | Mar. 8, 1938 |
| 2,442,754 | Beam | June 8, 1948 |
| 2,515,422 | Pietz | July 18, 1950 |
| 2,572,718 | Gifford | Oct. 23, 1951 |

FOREIGN PATENTS

| Number | Country | Date |
| --- | --- | --- |
| 143,349 | Switzerland | Jan. 16, 1931 |